United States Patent
De Kock (10) Patent No.: US 10,760,639 B2
(45) Date of Patent: Sep. 1, 2020

(54) SHOCK ABSORBER WITH COMFORT VALVE

(71) Applicant: Koni B.V, Oud-Beijerland (NL)

(72) Inventor: Paul De Kock, Numansdorp (NL)

(73) Assignee: Koni B.V, Oud-Beijerland (NL)

( * ) Notice: Subject to any disclaimer, the term of this patent is extended or adjusted under 35 U.S.C. 154(b) by 172 days.

(21) Appl. No.: 15/779,418

(22) PCT Filed: Nov. 28, 2016

(86) PCT No.: PCT/EP2016/079051
§ 371 (c)(1),
(2) Date: May 25, 2018

(87) PCT Pub. No.: WO2017/089620
PCT Pub. Date: Jun. 1, 2017

(65) Prior Publication Data
US 2018/0355945 A1    Dec. 13, 2018

(30) Foreign Application Priority Data

Nov. 27, 2015 (NL) .................................. 2015875

(51) Int. Cl.
*F16F 9/50* (2006.01)
*F16F 9/34* (2006.01)
(Continued)

(52) U.S. Cl.
CPC .......... *F16F 9/5126* (2013.01); *F16F 9/3482* (2013.01); *F16F 9/3488* (2013.01);
(Continued)

(58) Field of Classification Search
CPC ........ F16D 9/16; F16D 9/3485; F16D 9/3488; F16D 9/3482; F16D 9/5126; B60G 13/06; B60G 2202/24
See application file for complete search history.

(56) References Cited

U.S. PATENT DOCUMENTS 5,226,512 A * 7/1993 Kanari .................... F16F 9/512
188/282.2
5,788,372 A * 8/1998 Jones .................... B64D 27/26
137/513.3
(Continued)

FOREIGN PATENT DOCUMENTS

DE         10321351 A1    12/2004
DE    102013111502 A1     4/2015
(Continued)

OTHER PUBLICATIONS

International Search Reported, dated Jan. 10, 2017, from corresponding PCT Application No. PCT/EP2016/079051.

*Primary Examiner* — Thomas J Williams
*Assistant Examiner* — James K Hsiao
(74) *Attorney, Agent, or Firm* — Hertzberg, Turk & Associates, LLC (57) ABSTRACT

A shock absorber includes a cylinder; a piston dividing the cylinder into first and second chambers, the piston being movable within the cylinder in inward and outward directions; a first main channel and a first main non-return valve allowing a first main fluid flow from the second to the first cylinder chamber; a second main channel and a second main non-return valve allowing a second main fluid flow from the first to the second cylinder chamber; a comfort channel allowing an auxiliary fluid flow between the first and second cylinder chambers; and a comfort valve providing an open connection for the auxiliary fluid flow through the comfort channel in a rest position of the comfort valve and closing off the auxiliary fluid flow at increasing pressure difference across the comfort valve at either inward or outward movement to influence an auxiliary fluid flow between first and second piston sides.

28 Claims, 10 Drawing Sheets

(51) Int. Cl.
*F16F 9/16* (2006.01)
*B60G 13/06* (2006.01)
*F16F 9/512* (2006.01)
*F16F 9/348* (2006.01)

(52) U.S. Cl.
CPC .......... *B60G 13/06* (2013.01); *B60G 2202/24* (2013.01); *F16F 9/16* (2013.01); *F16F 9/3485* (2013.01)

(56) References Cited

U.S. PATENT DOCUMENTS

| | | | |
|---|---|---|---|
| 6,918,473 B2 * | 7/2005 | Deferme | F16F 9/5126 188/282.1 |
| 8,893,864 B2 * | 11/2014 | Park | F16F 9/5126 188/281 |
| 9,194,457 B2 * | 11/2015 | Kim | F16F 9/3485 |
| 9,797,466 B2 * | 10/2017 | Kim | F16F 9/185 |
| 2005/0045440 A1 * | 3/2005 | Kock | F16F 9/512 188/322.15 |
| 2005/0056506 A1 | 3/2005 | Deferme | |
| 2012/0305352 A1 * | 12/2012 | Yu | F16F 9/5126 188/275 |
| 2012/0312648 A1 * | 12/2012 | Yu | F16F 9/5126 188/280 |
| 2014/0048366 A1 * | 2/2014 | Lee | F16F 9/34 188/322.15 |
| 2015/0152936 A1 | 6/2015 | Kim | |
| 2016/0025180 A1 | 1/2016 | Fukushima et al. | |

FOREIGN PATENT DOCUMENTS

| | | |
|---|---|---|
| EP | 2108858 A2 | 10/2009 |
| WO | 2014157041 A1 | 10/2014 |

\* cited by examiner

SHOCK ABSORBER WITH COMFORT VALVE

CROSS-REFERENCE TO RELATED APPLICATIONS

The present application is the U.S. National Stage filing under 35 U.S.C. § 371 of International Patent Application No. PCT/EP2016/079051, filed on Nov. 28, 2016, which in turn claims priority under Patent Cooperation Treaty Article 8 and/or 35 U.S.C. 119(a) to Netherlands Patent Application No. 2015875, filed on Nov. 27, 2015.

FIELD OF THE INVENTION

The invention relates to a shock absorber comprising a cylinder having a cylinder wall; and a piston sealing against the cylinder wall and dividing the cylinder in first and second chambers, the piston being movable within the cylinder along the cylinder wall in inward and outward directions upon inward and outward movement, respectively, of the piston inside the cylinder, a first side of the piston being associated with the first cylinder chamber and a second side of the piston being associated with the second cylinder chamber; a first main channel and a first main non-return valve associated with the first main channel such that the first main channel and first main valve allow a first main fluid flow from the second to the first cylinder chamber upon inward movement; a second main channel and a second main non-return valve associated with the second main channel such that the second main channel and second main valve allow a second main fluid flow from the first to the second cylinder chamber.

BACKGROUND OF THE INVENTION

Shock absorbers are widely applied to damp motion between two parts, for instance, in cars, trains and other vehicles to damp a motion of the body with respect to the wheels. A main non-return valve is generally designed such that it only opens at a predetermined pressure difference across the valve and such as to have a predefined stiffness to provide damping of fluid flow between working chambers of the shock absorber. This causes a damping behavior of movements of the vehicle that can be considered as being uncomfortable for persons in the vehicle since it sets in very abrupt. Especially when a shock absorber is designed to provide a stiff damping characteristic it is conceived as not being very comfortable.

The predetermined preload of a non-return valve on the valve seat is required for noise reduction and determines a closing point in a transient from bump to rebound and from rebound to bump. This influences the damper performance and ride properties, and requires an improved solution to provide a better performance. Shock absorbers requiring a damping characteristic for both bump and rebound (inward and outward damping) conceptually generate a bump force that is generally ten times stiffer than in a standard twin tube configuration (proportional to (rod piston surface divided rod surface)$^2$). A return construction with slow closing feature but not requiring a preload for return movement is key to ride improvement and noise reduction.

EP 2 108 858 A2 discloses shock absorbers having a four or even five-stage damping characteristic for both inward and outward movements of the piston with respect to the cylinder of the shock absorber. The FIG. 3 embodiment of the publication presents a five-stage damping characteristic. The piston separates the cylinder into two working chambers and has an inward valve and an outward valve that each provide for a direct connection between both working chambers in the fifth (and last) damping stage of the shock absorber to allow for large fluid volume flows in between working chambers. The piston further comprises an auxiliary housing defining a cavity divided into two auxiliary chambers by a separating element that can move within the auxiliary housing. Each auxiliary chamber is by a respective opening in fluid communication with an associated working chamber of the shock absorber, and a bypass channel is provided on the internal surface of the auxiliary housing to provide a fluid connection between both auxiliary chambers when the opening of one of the auxiliary chambers to its associated working chamber is closed by the separating element. Each auxiliary chamber has a further opening with a valve to its associated working chamber, and openings with valves are provided on the separating element to allow fluid flow through the separating element between both auxiliary chambers. The arrangement of the auxiliary housing with its various elements allows for four damping stages, while the fifth damping stage comes in parallel to the flow through the auxiliary housing at large fluid volume flows between both working chamber. The shock absorber provides for a complex multi-stage damping behavior with noticeable transitions between damping stages. The construction of the shock absorber is also very complex and requires careful tuning of the various components, especially in relation to one another to achieve the required damping behavior. The design requires a rather long length of the piston and therefore an increased length of the shock absorber or a decreased stroke length at a same shock absorber length.

US 2015/0152936 A1 discloses a shock absorber having a connection channel between both sides of the piston and thus between compression and rebound chambers. An auxiliary piston valve assembly is arranged in the connection channel and closes the connection channel in dependency of frequency and stroke length. The auxiliary valve assembly provides for a sudden closure to switch between damping modes. The publication indicates that the shock absorber would be frequency-sensitive. However, the construction is such the frequency-sensitivity is quite badly defined. The behavior of the shock absorber will depend both on frequency and stroke length.

DE 103 21 351 A1 also discloses a shock absorber having a connection channel between both sides of the piston. The piston comprises a damping piston and a compensation piston. The compensation piston closes the channel very abruptly at large-amplitude oscillations to switch between damping modes. Large-amplitude damping will set in very abruptly and not provide a comfortable driving experience.

SUMMARY OF THE INVENTION

It is an objective of the invention to provide a shock absorber (damper) providing a damping characteristic that is conceived as comfortable.

It is another or alternative objective of the invention to provide a shock absorber having a simple and straightforward design.

It is yet another or alternative objective of the invention to provide a shock absorber providing a standard piston design with a big range of characteristic requirements with flexible cost friendly implementation.

It is yet another or alternative objective of the invention to provide improved ride behaviour with only minor changes at low cost to available damper designs.

It is yet another or alternative objective of the invention to provide a damper with many tuning abilities, especially at much lower cost.

At least one of the above objectives is achieved by a shock absorber comprising
- a cylinder having a cylinder wall; and
- a piston sealing against the cylinder wall and dividing the cylinder in first and second cylinder chambers, the piston being movable within the cylinder along the cylinder wall and along a longitudinal direction of the piston and the cylinder in inward and outward directions upon inward and outward movement, respectively, of the piston inside the cylinder, a first side of the piston being associated with the first cylinder chamber and a second side of the piston being associated with the second cylinder chamber;
- a first main channel and a first main non-return valve associated with the first main channel such that the first main channel and first main non-return valve allow and damp a first main fluid flow from the second to the first cylinder chamber;
- a second main channel and a second main non-return valve associated with the second main channel such that the second main channel and second main non-return valve allow and damp a second main fluid flow from the first to the second sides of the piston;
- a comfort channel arranged to allow an auxiliary fluid flow between the first and second cylinder chambers; and
- a comfort valve configured and arranged in the comfort channel such that the comfort valve provides for an open connection for the auxiliary fluid flow through the comfort channel in a rest position of the comfort valve and gradually closes off the auxiliary fluid flow at increasing pressure difference across the comfort valve at either inward or outward movement to influence the auxiliary fluid flow between the first and second sides of the piston.

A side of the piston being associated with one of the cylinder chambers is intended to mean that said side of the piston is in contact with said cylinder chamber. A valve being associated with a channel is intended to mean that said valve will influence a fluid flow in said channel.

In an embodiment the comfort valve is configured and arranged to allow deformation of the comfort valve at a pressure difference across the comfort valve, an open area of at least one flow opening allowing the auxiliary fluid flow past the comfort valve being gradually decreased upon increased deformation of the comfort valve.

In an embodiment the comfort valve comprises a plate-shaped valve, optionally the comfort valve being formed by a stack of at least one plate-shaped valve, optionally the stack of the at least one plate-shaped valve comprising a free end.

In an embodiment the at least one flow opening comprises at least one flow opening in the (stack of the at least one) plate-shaped valve and the shock absorber comprises closing surfaces against which the (stack of the at least one) plate-shaped valve deforms upon inward and outward movement to gradually close off the at least one flow opening in the (stack of the at least one) plate-shaped valve.

In an embodiment the closing surfaces present a curvature, and the (stack of the at least one) plate-shaped valve upon deformation conforms to the curvature so that the open area of the at least one flow opening in the (stack of at least one) plate-shaped valve is gradually closed by the closing surfaces.

In an embodiment the plate-shaped valve comprises a free outer circumference and at least one flow opening arranged between the free outer circumference and a position at which the plate-shaped valve is clamped, optionally the plate-shaped valve comprising a circular outer circumference.

In an embodiment the shock absorber comprises first and second clamping parts, the comfort valve being provided in between the first and second clamping parts, optionally the comfort valve being clamped in between the first and second clamping parts.

In an embodiment the first and second clamping parts define the closing surfaces.

In an embodiment the comfort channel is arranged in direct fluid communication with first and second main channels.

In an embodiment the piston comprises
- a connecting member, optionally a ring-shaped connecting member;
- a first central member received in the connecting member at a first side of the connecting member, which is transverse to the longitudinal direction of the piston and associated with the first side of the piston, a first central member channel being provided on a side of the first central member, which is transverse to the longitudinal direction of the piston and associated with the second side of the piston, the first central member channel being in fluid communication with the second side of the piston; and
- a second central member received in the connecting member at a second side of the connecting member, which is transverse to the longitudinal direction of the piston and associated with the second side of the piston, a second central member channel being provided in a side of the second central member, which is transverse to the longitudinal direction of the piston and associated with the first side of the piston, the second central member channel being in fluid communication with the first side of the piston, and wherein the comfort channel comprises the first and second central member channels and the comfort valve is provided in between the first and second central member channels.

A side of one member being associated with a side of another member is intended to mean that said side of said one member and said side of said other member are corresponding sides substantially directed in a same direction, for instance, both being top sides that are directed upwards or both being bottom sides that are directed downwards. The connecting member, and first and second central members are to be understood as being separate items.

In an embodiment the connecting member comprises a part of the first main channel and a part of the second main channel, the first central member comprises another part of the first main channel such that the parts of the first main channel in the connecting member and the first central member are in line, and the second central member comprises another part of the second main channel such that the parts of the second main channel in the connecting member and the second central member are in line.

In an embodiment the connecting member is configured for movement along and sealing against the cylinder wall.

In an embodiment the first main non-return valve is provided on the first central member.

In an embodiment the second main non-return valve is provided on the second central member.

In an embodiment the part of the first main channel in the connecting member has two ends, one end being in line with the part of the first main channel in the first central member and the other end being in direct fluid connection with the second side of the piston.

In an embodiment the part of the second main channel in the connecting member has two ends, one end being in line with the part of the second main channel in the second central member and the other end being in direct fluid connection with the first side of the piston.

In an embodiment the first central member channel comprises a first central member groove provided at the side of the first central member associated with the second side of the piston.

In an embodiment the second central member channel comprises a second central member groove provided at the side of the second central member associated with the first side of the piston.

In an embodiment the first central member groove comprises an annular groove, the second central member groove comprises an annular groove, and the auxiliary valve comprises a stack of at least one annular plate valve.

In an embodiment the first central member channel is in direct fluid connection with the part of the first main channel in the first central member, optionally a first auxiliary channel being provided in the first central member, which extends from the first central member channel to a side of the first central member opposing the side comprising the first central member channel, to provide for a direct fluid connection between the first central member channel and the part of the first main channel in the first central member. A direct fluid connection is intended to be understood as a fluid connection in which fluid can freely flow without obstruction by a valve.

In an embodiment the second central member channel is in direct fluid connection with the part of the second main channel in the second central member, optionally a second auxiliary channel being provided in the second central member, which extends from the second central member channel to a side of the second central member opposing the side comprising the second central member channel, to provide for a direct fluid connection between the second central member channel and the part of the second main channel in the second central member.

In an embodiment the connecting member comprises one of a slot and projection at its internal perimeter, and at least one of the first and second central members comprises the other one of the projection and the slot at its external perimeter, the slot and projection being configured to cooperate such as to align the connecting member and the at least one of the first and second central members with respect to one another.

In an embodiment the connecting member and at least one of the first and second central members are fitted, optionally press-fitted, into one another such as to provide a sealing fit.

In an embodiment the piston comprises more than one first main channel, the connecting member comprising a part of each first main channel in line with another part of each first main channel comprised in the first central member.

In an embodiment the piston comprises more than one second main channel, the connecting member comprising a part of each second main channel in line with another part of each second main channel comprised in the second central member.

In an embodiment the parts of the first and second main channels in the connecting member are provided alternately in the connecting member.

In another aspect the invention provides a piston for use in a shock absorber referred to above, the piston comprising
a connecting member, optionally a ring-shaped connecting member;
a first central member received in the connecting member at a first side of the connecting member, which is transverse to the longitudinal direction of the piston and associated with the first side of the piston, a first central member channel being provided on a side of the first central member, which is transverse to the longitudinal direction of the piston and associated with the second side of the piston, the first central member channel being in fluid communication with the second side of the piston; and
a second central member received in the connecting member at a second side of the connecting member, which is transverse to the longitudinal direction of the piston and associated with the second side of the piston, a second central member channel being provided in a side of the second central member, which is transverse to the longitudinal direction of the piston and associated with the first side of the piston, the second central member channel being in fluid communication with the first side of the piston, and
wherein the comfort channel comprises the first and second central member channels and the comfort valve is provided in between the first and second central member channels.

In an embodiment the connecting member comprises a part of the first main channel and a part of the second main channel, the first central member comprises another part of the first main channel such that the parts of the first main channel in the connecting member and the first central member are in line, and the second central member comprises another part of the second main channel such that the parts of the second main channel in the connecting member and the second central member are in line.

BRIEF DESCRIPTION OF THE DRAWINGS

Further features and advantages of the invention will become apparent from the description of the invention by way of non-limiting and non-exclusive embodiments. These embodiments are not to be construed as limiting the scope of protection. The person skilled in the art will realize that other alternatives and equivalent embodiments of the invention can be conceived and reduced to practice without departing from the scope of the present invention. Embodiments of the invention will be described with reference to the accompanying drawings, in which like or same reference symbols denote like, same or corresponding parts, and in which.

DETAILED DESCRIPTION OF EMBODIMENTS

Figure 1:
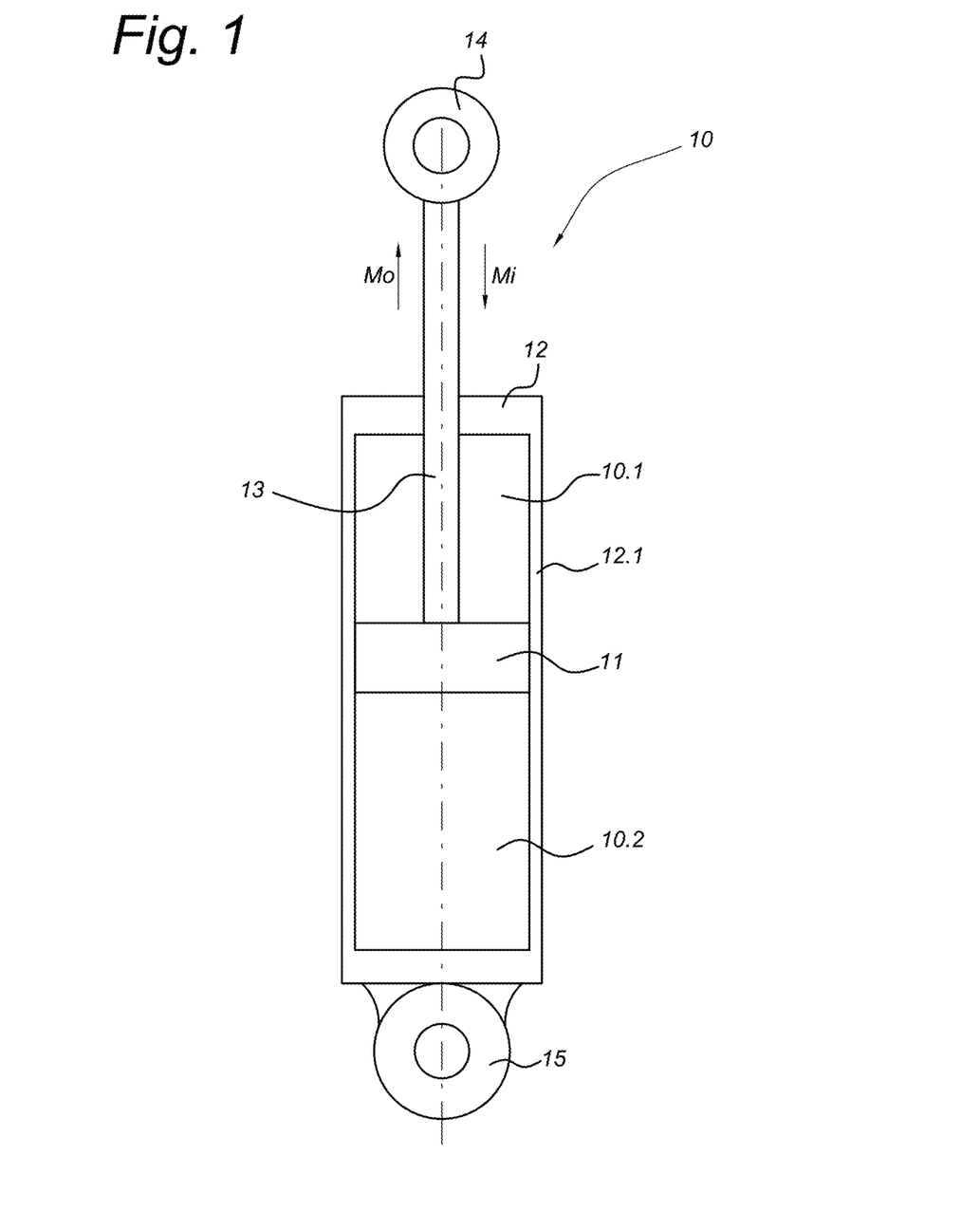
FIG. 1 shows a first embodiment of a damper (shock absorber) according to the invention.

FIG. 1 schematically shows a shock absorber or damper 10 according to the invention. The damper comprises a cylinder 12 and a piston 11 that can move within the cylinder in inward and outward directions with respect to the cylinder. The direction of movement of the inward and outward strokes of the piston are indicated by the arrows labeled Mi and Mo, respectively. The piston seals against the cylindrical wall 12.1 of the cylinder and divides the cylinder in a first or upper cylinder chamber 10.1 and a second or lower cylinder chamber 10.2. A piston rod 13 attached to the piston 11 is in a sealing fashion guided through a top wall of the cylinder 12. The damper can be attached by its piston and cylinder attachment arrangements 14, 15 to, for instance, parts of a car to damp relative movements. Damping is achieved by influencing a fluid flow in between first and second cylinder chambers by an arrangement in the piston 11.

Figure 2:
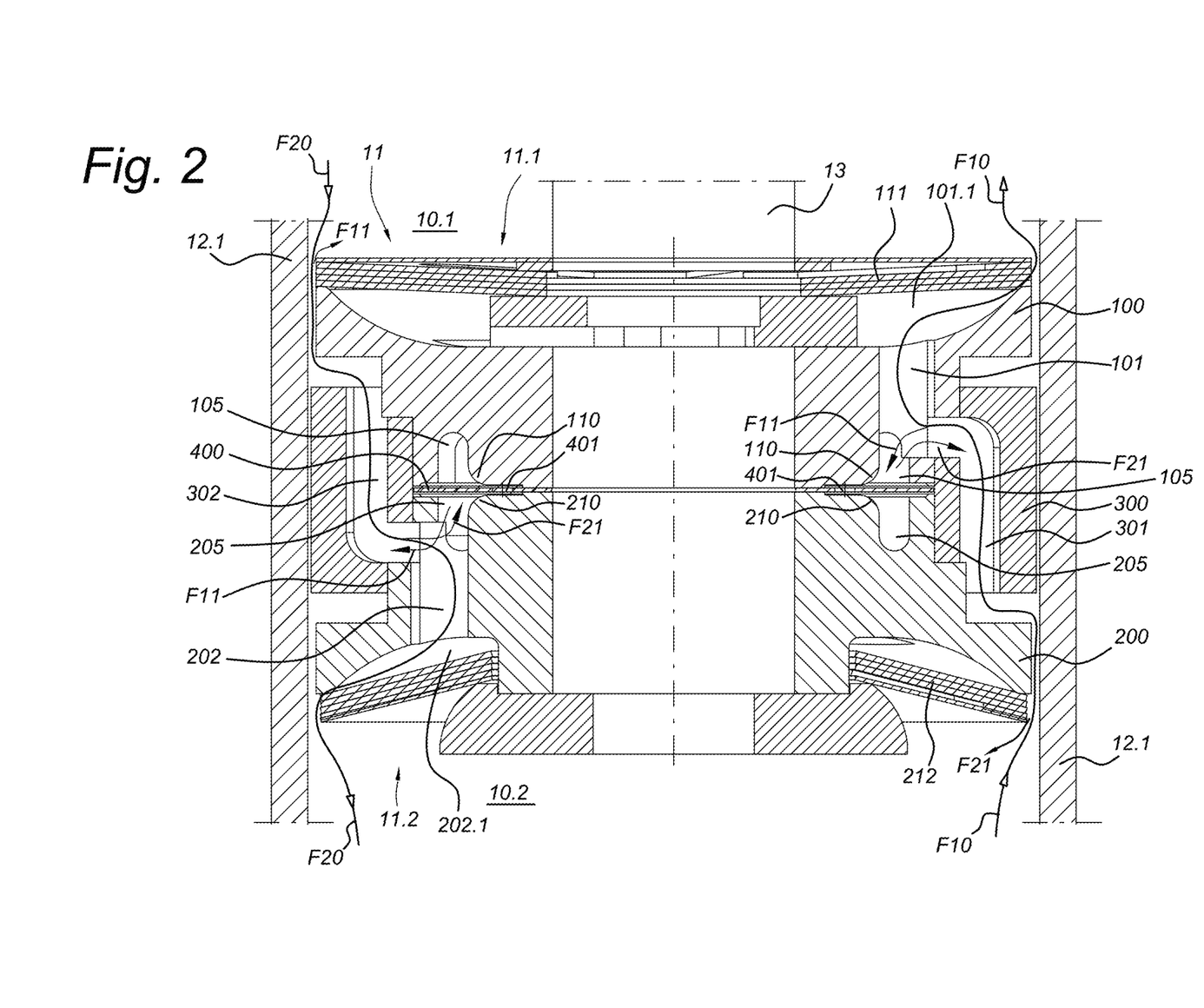
FIG. 2 shows a first embodiment of the piston of the shock absorber of FIG. 1 in cross-section.

The piston according to a first embodiment is shown in more detail and in cross-section in FIG. 2. A top or first side 11.1 of the piston is directed towards and associated with the first cylinder chamber 10.1, and a bottom or second side 11.2 of the piston is directed towards and associated with the second cylinder chamber 10.2.

A first main channel 301, 101 passes through the piston 11 to allow for a first main fluid flow F10 from the second side 11.2 to the first side 11.1 of the piston and therefore from the second cylinder chamber 10.2 to the first cylinder chamber 10.1. A first main non-return valve 111 is arranged at the piston first side 11.1 and is associated with the first main channel 301, 101 so as to open for fluid flow from the second cylinder chamber 10.2 through the first main channel towards the first cylinder chamber 10.1 and piston first side 11.1. The first main non-return valve 111 is closed for fluid flow in the opposite direction, although may allow for a small constant fluid flow in either direction by providing a relatively small constant opening. The first main fluid flow F10 flows through the first main channel 301, 101 upon inward movement Mi of the piston 11 within the cylinder 12. The first main fluid flow and associated inward movement of the piston is damped by the first main channel and the first main non-return valve.

In the same manner a second main channel 302, 202 passes through the piston 11 to allow for a second main fluid flow F20 from the piston first side 11.1 and first cylinder chamber 10.1 to the piston second side 11.2 and second cylinder chamber 10.2. A second main non-return valve 212 is arranged at the piston second side 11.2 and is associated with the second main channel 302, 202 so as to open for fluid flow from the first cylinder chamber 10.1 through the second main channel towards the second cylinder chamber 10.2 and piston second side 11.2. The second main non-return valve is closed for fluid flow in the opposite direction, but may also allow for a relatively small constant fluid flow in either direction by providing a constant opening. The second main fluid flow F20 flows through the second main channel 302, 202 upon outward movement Mo of the piston 11 within the cylinder 12. The second main fluid flow and associated outward movement of the piston is damped by the second main channel and the second main non-return valve.

The piston body comprises first and second central members 100, 200 and a connecting member 300. The first (or top) central member 100 is received into the connecting member 300 at a top or first side of the connecting member, which is associated with the piston first side 11.1. The second (or bottom) central member 200 is received into the connecting member at a bottom or second side of the connecting member, which is associated with the piston second side 11.2. The first and second central members 100, 200 and the connecting member 300 are shown in more detail in FIGS. 3, 5a and 5b, respectively. The connecting member 300 seals against the cylinder wall 12.1 and is shaped to move along the cylinder wall. Both central members 100, 200 leave a clearance between them and the cylinder wall.

The connecting member 300 comprises parts 301, 302 of both the first main channel and the second main channel, respectively. First main channel part 301 is in fluid connection with first main channel part 101 of the top (first) central member 100 to form the first main channel in between first and second sides 11.1, 11.2 of the piston. The part 301 of the first main channel in the connecting member has opposing ends. One end is in line with the part 101 of the first main channel in the top central member 100 and the other end is in fluid connection with the piston second side 11.2. Second main channel part 302 is in fluid connection with second main channel part 202 of the bottom (second) central member 200 to form the second main channel in between first and second sides 11.1, 11.2 of the piston. The part 302 of the second main channel in the connecting member 300 also has opposing ends. One end is in line with the part 202 of the second main channel in the bottom central member 200 and the other end is in fluid connection with the piston first side 11.1. The clearances between the central members and the cylinder wall allow fluid to flow into the first and second main channel. The respective clearances may also be regarded as a part of the first and second main channels.

Actually, the piston comprises more than one first main channel 301, 101 and more than one second main channel 302, 202 in the embodiment shown. This shows especially in FIGS. 3, 5a and 5b. The connecting member 300 comprises parts 301 for each first main channel and parts 302 for each second main channel. Each part 301 of each first main channel is in line with another part 101 of each first main channel comprised in the first central member 100. Correspondingly, each part 302 of each second main channel is in line with another part 202 of each second main channel comprised in the second central member 200. FIG. 4 shows that the parts 301 and 302 are arranged alternately in the connecting member 300. The connecting member, and the first and second central members are fitted, especially press-fitted into one another so as to provide a sealing fit.

The first main non-return valve 111 is provided on the top central member 100 and closes off the first main channel 301, 101. Likewise, the second main non-return valve 212 is provided on the bottom central member and closes of the second main channel 302, 202. As indicated above, one or both of the main non-return valves 111, 212 may provide for a constant opening to allow for a constant fluid flow across the respective valve in either direction. Such constant opening may, for instance, be provided in the valve or in the valve seat. One or both of the main non-return valves comprise one or more plates in the embodiment shown.

FIGS. 2, 3, 5a and 5b further show central member channels 105, 205 in the first and second central members 100, 200, respectively, and an auxiliary valve 400 provided in between the first and second central member channels 105, 205.

Figure 3:
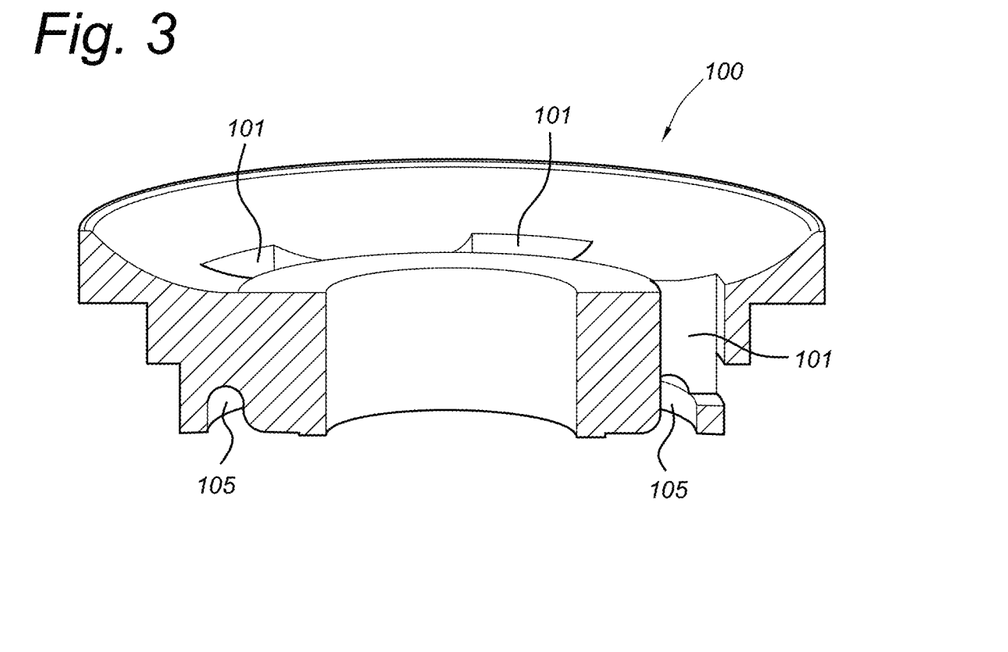
FIGS. 3 and 4, show the first central member and the connecting member, respectively, of the piston of FIG. 2 in cross-sectional perspective views
Figure 4:
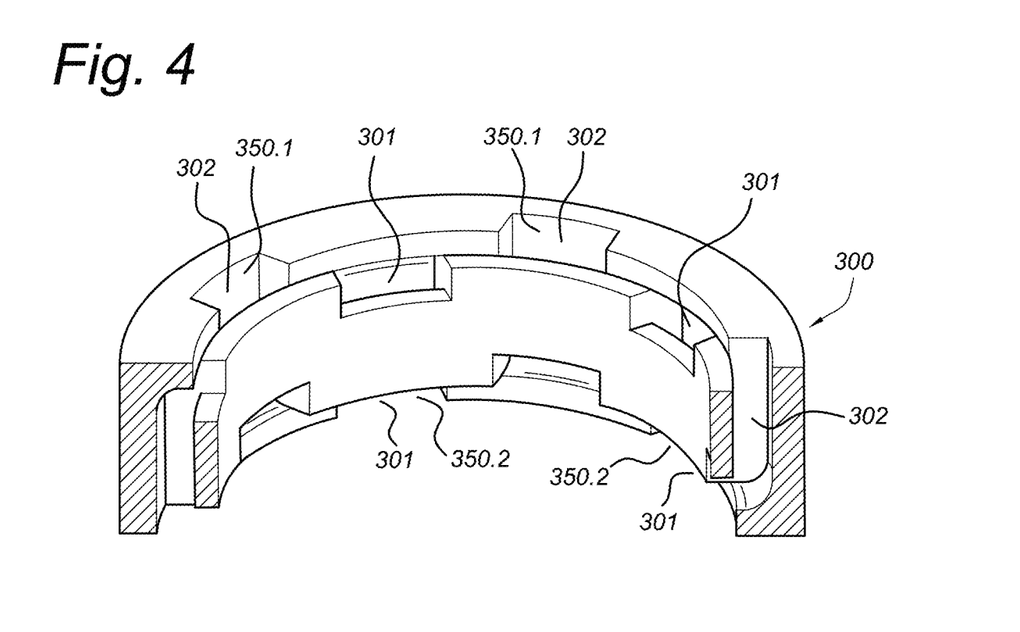

The first central member channel 105 is provided in the bottom side of the first central member 100 in FIGS. 2 and 3. The bottom side of the first central member is associated with the second side 11.2 of the piston, meaning that both the bottom side of the first central member and the second side 11.2 of the piston are at corresponding sides. The second piston side 11.2 is also the bottom side of the piston in FIG. 2. The first central member channel 105 is in fluid communication with first main channel part 101 in the first central member 100 and is visible on the right-hand side in FIGS. 2 and 3. Therefore, the first central member channel 105 is via the first main channel in fluid communication with the second side 11.2 of the piston and thus with the second cylinder chamber 10.2, which is visible at the right-hand side of FIG. 2 as well. The first central member channel is shaped as a groove, especially an annular groove, arranged at the side of the first central member associated with the second side 11.2 of the piston.

Figure 5A:
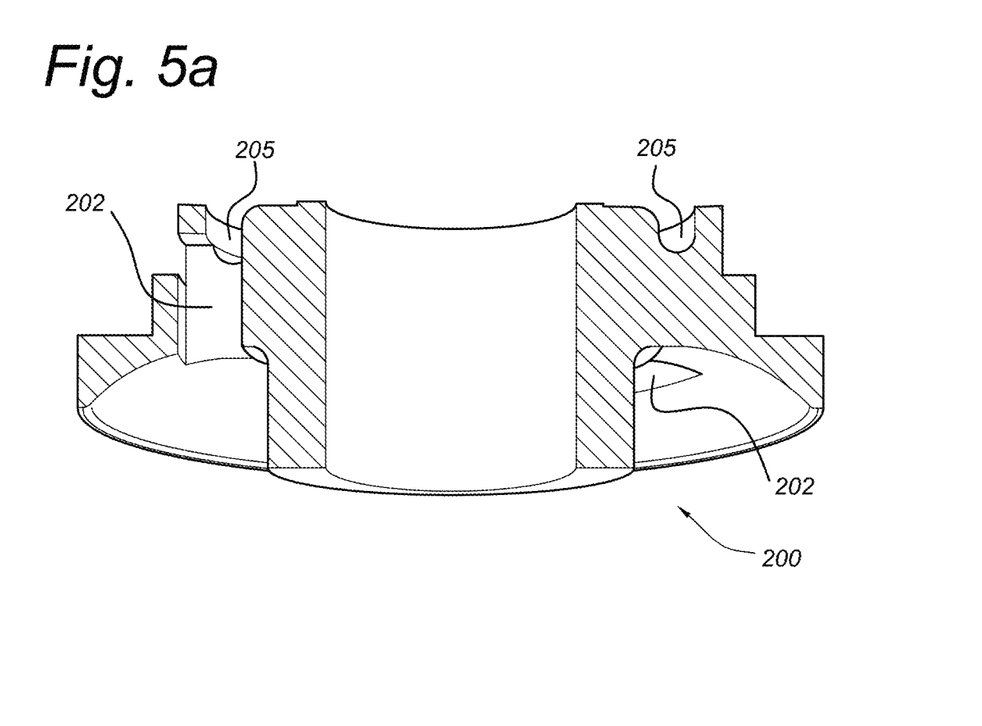
FIGS. 5a and 5b show the second central member of the piston of FIG. 2 in cross-sectional perspective views.
Figure 5B:
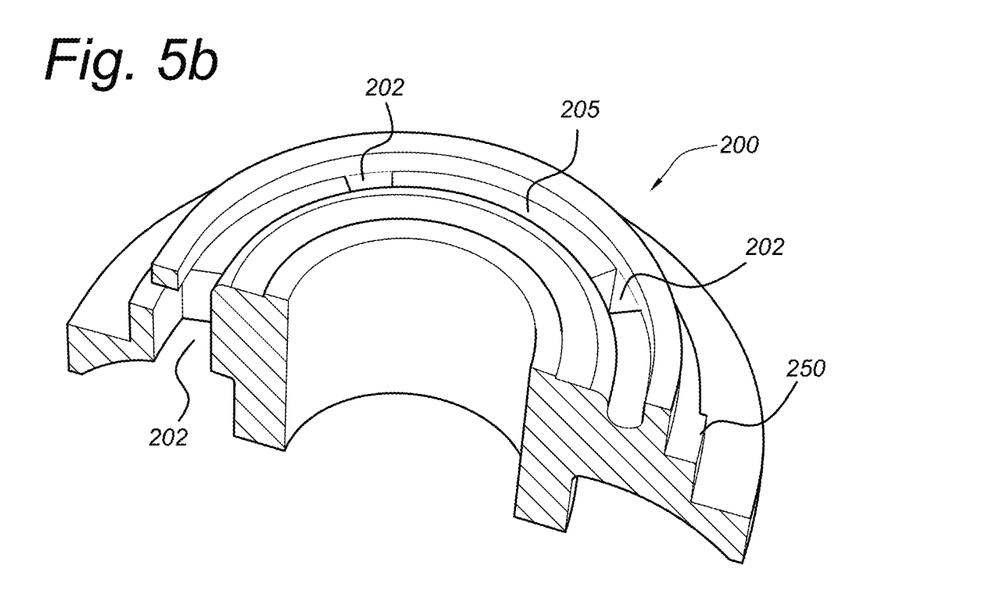

Correspondingly, the second central member channel 205 is provided in the top side of the second central member 200 in FIGS. 2, 5a and 5b. The top side of the second central member is associated with the first side 11.1 of the piston, meaning that both the top side of the second central member and the first side 11.1 of the piston are at a corresponding sides. The first piston side 11.1 is also the top side of the piston in FIG. 2. The second central member channel 205 is in fluid communication with the second main channel part 202 in the second central member 200 and is visible on the left-hand side in FIGS. 2, 5a and 5b. Therefore, the second central member channel 205 is via the second main channel in fluid communication with the first side 11.1 of the piston and thus with the first cylinder chamber 10.1, which is also visible at the left-hand side in FIG. 2. The second central member channel is also shaped as a groove, especially an annular groove, arranged at the side of the second central member associated with the first side 11.1 of the piston.

Figure 6:
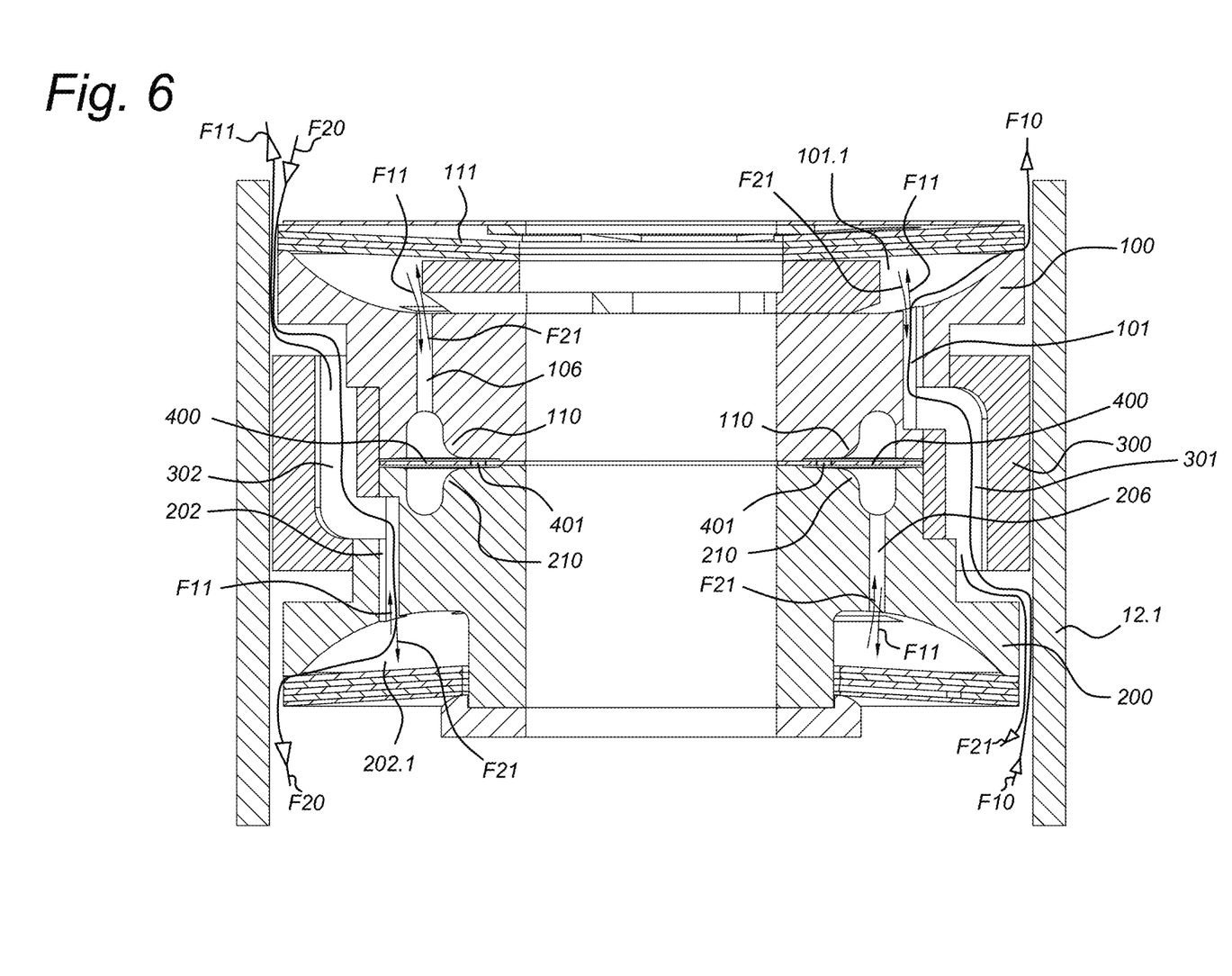
FIG. 6 shows a second embodiment of the piston of FIG. 1 in cross-section.
Figure 7:
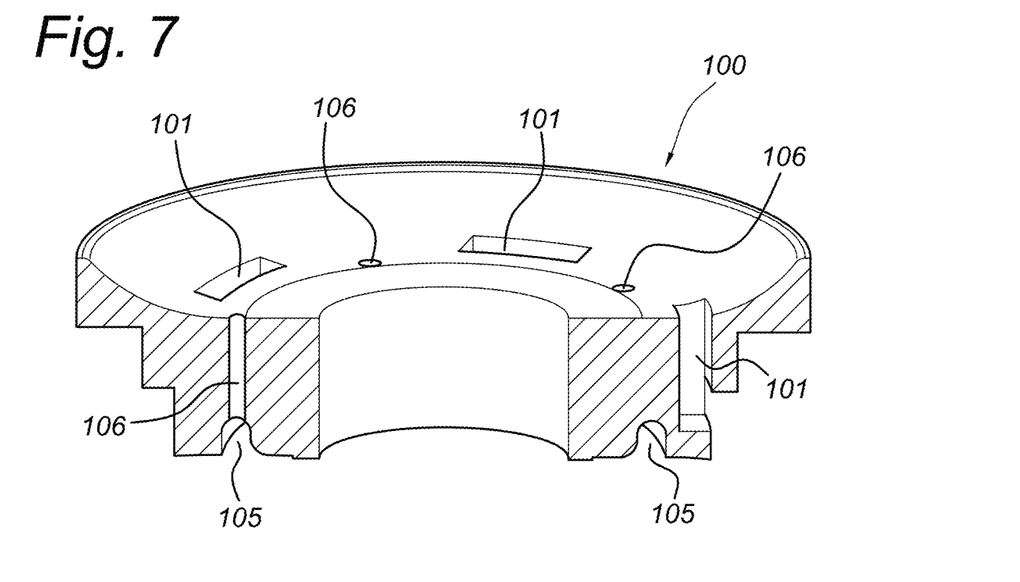
FIG. 7 shows the first central member of the embodiment of FIG. 6 in cross-sectional perspective view.
Figure 8:
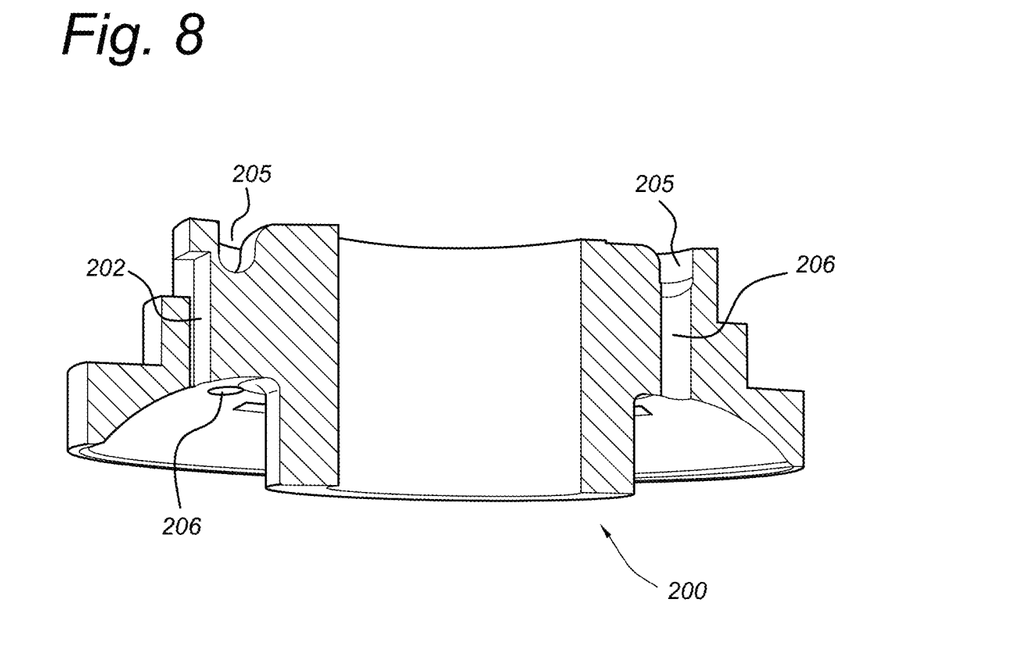
FIG. 8 shows the second central member of the embodiment of FIG. 6 in cross-sectional perspective view.

FIGS. 6, 7 and 8 show a second embodiment. The second embodiment is largely identical to the embodiment in FIGS. 2, 3, 4, 5a and 5b. However, the first central member channel in the form of annular first central member groove 105 is in a different manner in fluid connection with the second piston side 11.2. The first central member groove 105 is via first auxiliary channel 106 in fluid connection with first main valve chamber 101.1 between first central member 100 and main non-return valve 111. First main valve chamber 101.1 is in fluid connection with the second piston side 11.2 via first main channel 101, 301 so that first central member channel 105 is in fluid connection with the second piston side 11.2. In a corresponding fashion second central member channel in the form of annular second central member groove 205 is via second auxiliary channel 206 in fluid connection with second main valve chamber 202.1 between second central member 200 and the second main non-return valve 212. The second main valve chamber 202.1 is via second main channel 202, 302 in fluid connection with the first piston side 11.1.

Figure 9A:
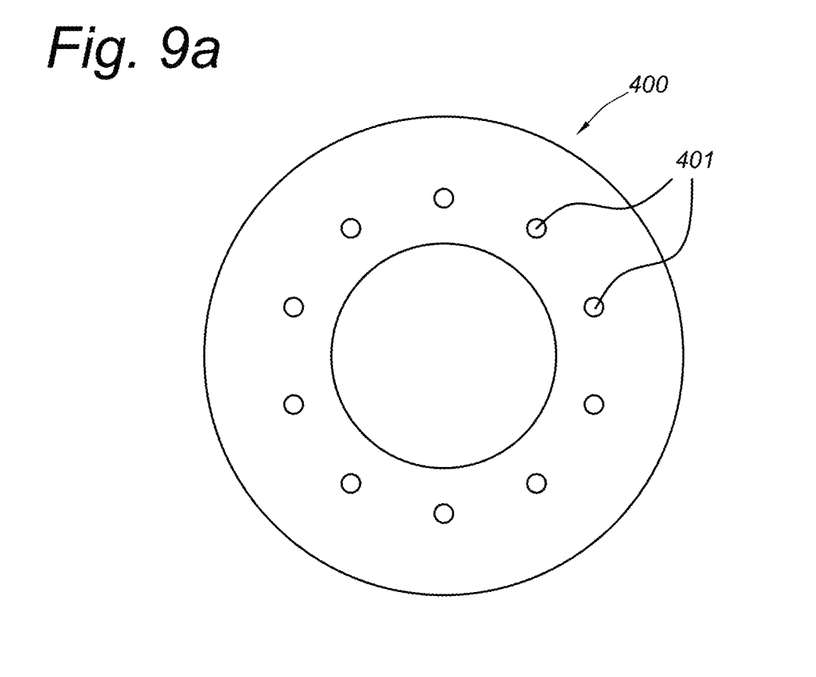
FIGS. 9a and 9b show two embodiments of an auxiliary valve of the embodiments of FIGS. 2 and 6.
Figure 9B:
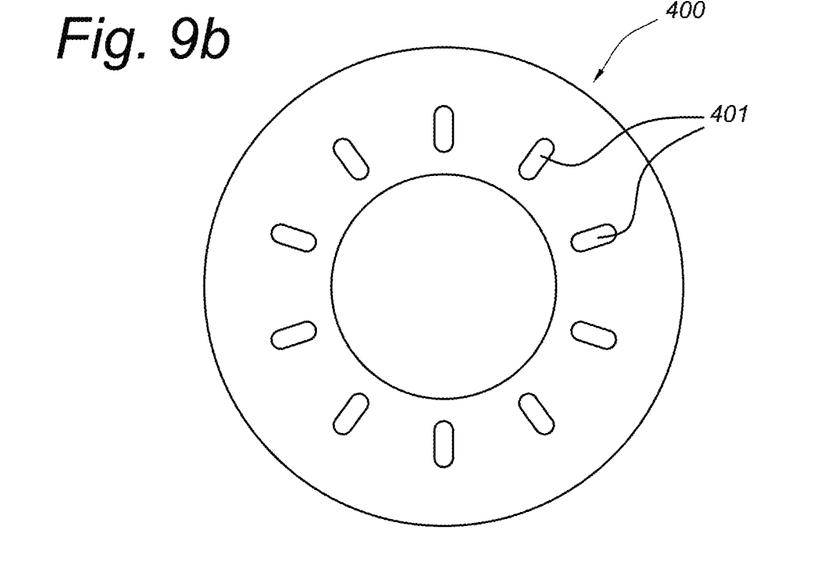

An auxiliary valve 400 in the form of an annular plate valve is provided in between the first and second central members 100, 200 in the second embodiment and its variant, such that fluid may flow past auxiliary valve 400 in a neutral or rest position thereof. The neutral position of the auxiliary valve is shown in FIGS. 2 and 6. The annular plate valve 400 is clamped at its internal perimeter between first and second central members 100, 200. The external perimeter of auxiliary annular plate valve 400 is left free to move between the first and second central members. The auxiliary annular plate valve 400 is further provided with openings 401 to allow passage of fluid from first annular central member groove 105 to second annular central member groove 205, or vice versa. FIGS. 9a and 9b show top views on two embodiments of an annular plate valve 400. The embodiment of FIG. 9a has multiple round openings 401, while the embodiment of FIG. 9b has elongated openings. Various other embodiments may be conceived as well. One may vary in various parameters such as number, shape and locations of the openings 401 and thickness, shape and material of the plate valve 400. The auxiliary valve may also comprise more than one plate valve.

Figure 10A:
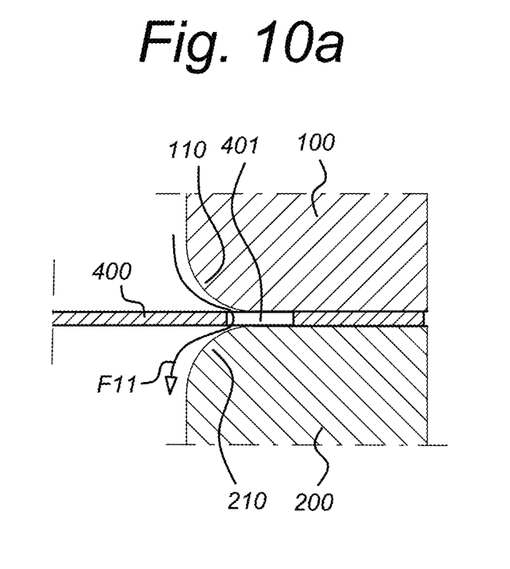
FIGS. 10a and 10b show a detail of the auxiliary valve of FIGS. 2 and 6 in a neutral and a deformed state, respectively.
Figure 10B:
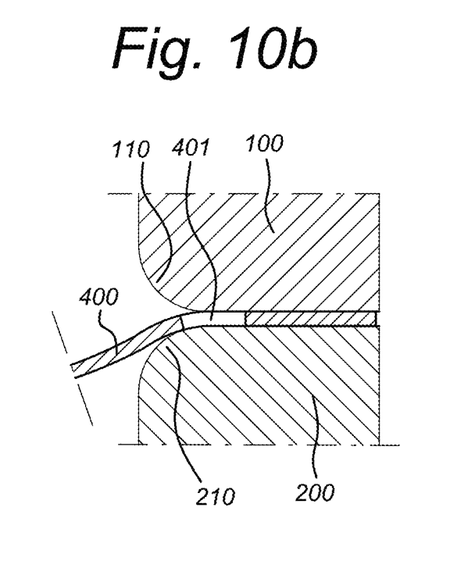
Figure 11A:
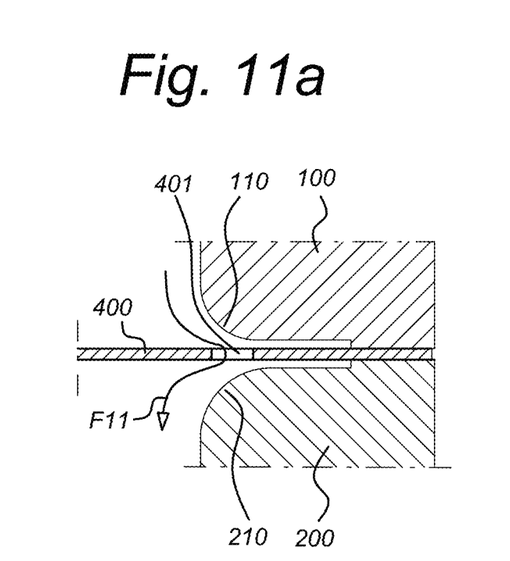
FIGS. 11a and 11b show a variant of a detail of the auxiliary valve of FIGS. 2 and 6 in a neutral and a deformed state, respectively.
Figure 11B:
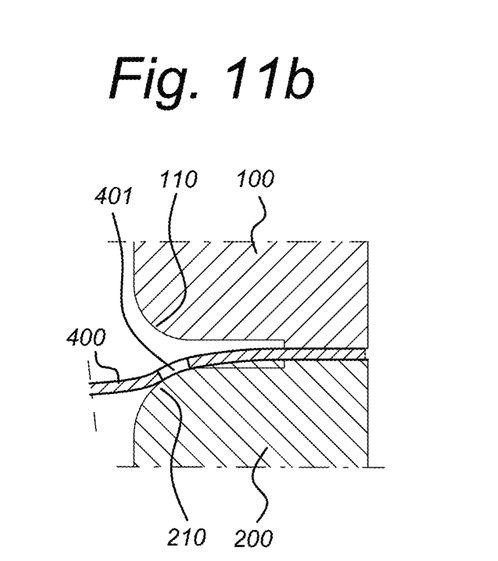

Upon pressure build-up across auxiliary valve 400 upon fluid flow in either direction past the auxiliary valve, the auxiliary valve will move in the direction of the fluid flow and gradually deform against either the first or second central member 100, 200. Both the first and second central members 100, 200 have a rounded edge 110, 210 against which the auxiliary annular plate valve 400 deforms such as to gradually close off the openings 401 in the auxiliary valve. FIGS. 10a, 10b, 11a and 11b show a detail of the annular plate valve 400 clamped in between first and second central members 100, 200. A neutral or rest position of the plate valve 400 is shown in FIGS. 10a and 11a, in which further a fluid flow F11 is depicted as an example fluid flow. FIGS. 10b and 11b show the plate valve 400 in a deformed state closing off the openings 401 against rounded edge 210. The FIGS. 11a and 11b variant shows an additional stepped surface of the first and second central members 100, 200 at the position where the plate valve is clamped. The stepped surfaces allow for some additional fluid volume around the openings 401 and provide another parameter that can be varied to tune the damping characteristics. The auxiliary valve at its external perimeter will also close against either the first or second central member to close of fluid flow past the external perimeter. The auxiliary valve thus gradually closes of fluid flow upon pressure build up across the auxiliary valve 400.

Upon inward movement Mi of the piston 11 inside the cylinder 12 a first main fluid flow F10 will pass through first main channel 301, 101 from the second cylinder chamber 10.2. A first auxiliary fluid flow F11 branches of from the first main fluid flow F10 to the first auxiliary annular groove 105 and flows past the auxiliary valve 400 into the second auxiliary annular groove 205 through second main channel 202, 302 towards the first cylinder chamber 10.1 with reference to FIG. 2. With reference to FIG. 6, the first auxiliary fluid flow F11 branches of from the first main fluid flow F10 within the first main valve chamber 101.1 and passes through first auxiliary channel 106 into first central member groove 105 towards and past the auxiliary valve 400 into second central member groove 205 and subsequently into second auxiliary channel 206, second main valve chamber 202.1 and second main channel 202, 302 into first cylinder chamber 10.1. The first auxiliary fluid flow F11 is only present when the auxiliary valve is still close to its neutral position at the initial phase of the inward movement Mi. A pressure difference will build up across the auxiliary valve 400 such that it gradually closes off the first auxiliary fluid flow F11, which will cause a further pressure build up inside first main valve chamber 101.1. At sufficient pressure difference across first main non-return valve 111, the first main non-return valve opens to allow first main fluid flow F10 into the first cylinder chamber 10.1.

Correspondingly, upon outward movement Mo of the piston 11 within the cylinder 12 a second main fluid flow F20 will pass through the second main channel 302, 202 from the first cylinder chamber. A second auxiliary fluid flow F21 branches of from the second main fluid flow F20 to the second auxiliary annular groove 205 and flows past the auxiliary valve 400 into the first auxiliary annular groove 105 through first main channel 101, 301 towards the second cylinder chamber 10.2 with reference to FIG. 2. With reference to FIG. 6, the second auxiliary fluid flow F21 branches of from the second main fluid flow F20 within the second main valve chamber 202.1 and passes through second auxiliary channel 206 into second central member groove 205 towards and past the auxiliary valve 400 into first central member groove 105 and subsequently into first auxiliary channel 106, first main valve chamber 101.1 and first main channel 101, 301 into second cylinder chamber 10.2. The second auxiliary fluid flow F21 is also only present when the auxiliary valve 400 is still close to its neutral position at the initial phase of the outward movement Mo. A pressure difference will build up across the auxiliary valve 400 such that it gradually closes off the second auxiliary fluid flow F21, which will cause a further pressure build up inside second main valve chamber 202.1. At sufficient pressure difference across second main non-return valve 212, the second main non-return valve opens to allow second main fluid flow F20 into the second cylinder chamber 10.2.

The gradual closing off of fluid flows F11, F21 by auxiliary valve 400 upon inward or outward piston movement Mi, Mo before opening of first or second main non-return valve 111, 212, respectively, provides comfort to persons travelling in a vehicle in which the damper having such piston is employed.

FIG. 5b shows a view on the top side of second central member 200. A projection 250 at the circumference of the second central member is configured to cooperate with a slot 350.1 at the bottom side of the connecting member 300, as visible in FIG. 4. The slot 350.1 is actually a part of first main channel part 301 in the connecting member. Correspondingly, the first central member 100 may also have projections shaped for cooperation with mating slots in the connecting member 300, such as slots 350.1 that are part of the second main channel part 302. Multiple projections may be arranged around the circumference of first and/or second central members 100, 200 for cooperation with corresponding slots in the connecting member 300.

Further exemplary embodiments of a shock absorber or damper 10 having a bi-directional comfort valve are shown in FIGS. 12-15. These figures show two embodiments in FIGS. 12 and 13 and FIGS. 14 and 15, respectively, having a piston 11 dividing a cylinder 12 in first and second cylinder chambers 10.1, 10.2. A first main channel 501 and associated first main non-return valve 111 allow for a first main fluid flow from the second to the first cylinder chamber at inward movement of the piston. A second main channel 502 and associated second main non-return valve 212 allow for a second main fluid flow at outward movement of the piston. Functioning and damping by the main channels 501, 502 and main non-return valves 111, 212 is similar as has been described earlier. Both embodiments of FIGS. 12-15 do not have a comfort valve and comfort channel arranged in the piston 11.

Figure 12:
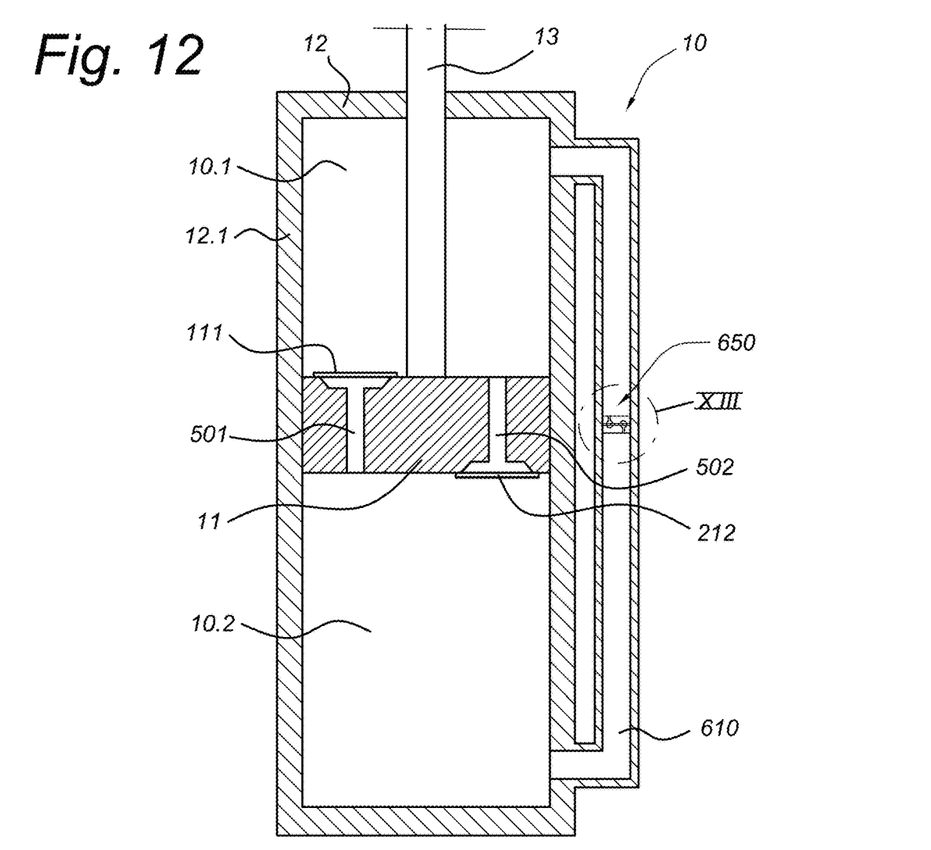
FIG. 12 shows another embodiment of a shock absorber according to the invention.
Figure 13:
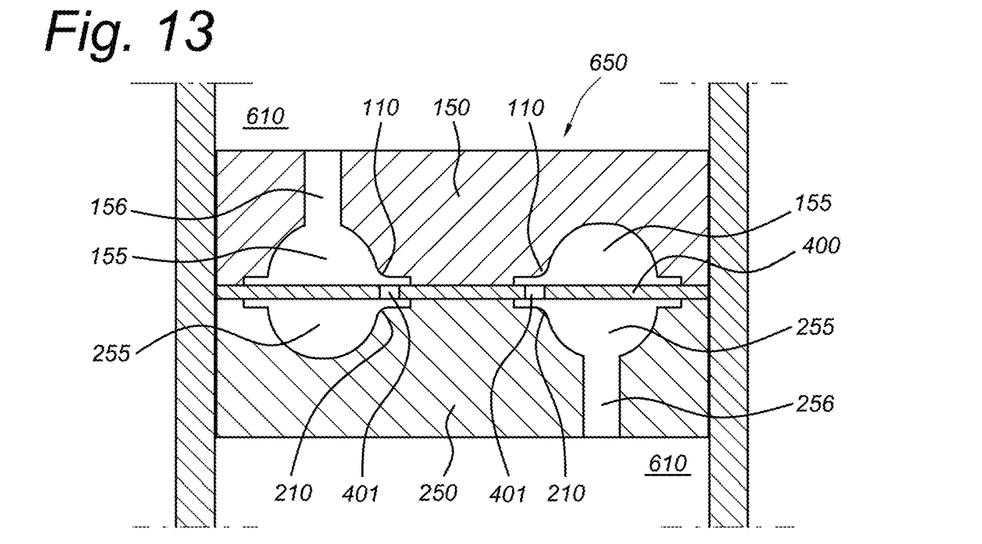
FIG. 13 shows a detail of a comfort valve of the shock absorber of FIG. 12.

The embodiment shown in FIGS. 12 and 13 comprises a tube-like channel 610, both ends of which are in fluid connection with the first and second cylinder chambers 10.1, 10.2. A comfort valve arrangement 650, shown in more detail in FIG. 13, is provided in the comfort channel 650 and comprises first and second members 150, 250 that are fixedly provided in the channel 610. A comfort valve 400 having openings 401 is clamped in between the first and second members 150, 250. Annular grooves 155, 255 are provided in sides of the first and second members facing the comfort valve 400 and are in fluid connection with the channel 610 through auxiliary channels 156, 256 in the first and second members 150, 250. Multiple auxiliary channels 156, 256 are provided in between annular the grooves 155, 156 and the channel 610, but only one auxiliary channel 156 and one auxiliary channel 256 is shown in FIG. 13. The channel 610 together with the annular grooves 155, 256 and the auxiliary channels 155, 256 provide for the comfort channel. The comfort valve is shaped as a plate valve 400 having cylindrical symmetry. Comfort plate valve 400 is clamped at its center in between the first and second members 150, 250, while its outer perimeter is not clamped. The first and second members 150, 250 have rounded edges 110, 210 and may be shaped in a similar fashion as has been described with reference to FIGS. 2, 6, 10a, 10b, 11a and 11b. The openings 401 in the valve plate 400 closes against the rounded edges upon deformation of the valve plate at fluid flow in the comfort channel. The functioning and damping behavior of the comfort channel 610, 156, 155, 255, 256 and comfort valve 400 is similar as has been described with respect to the earlier embodiments.

Figure 14:
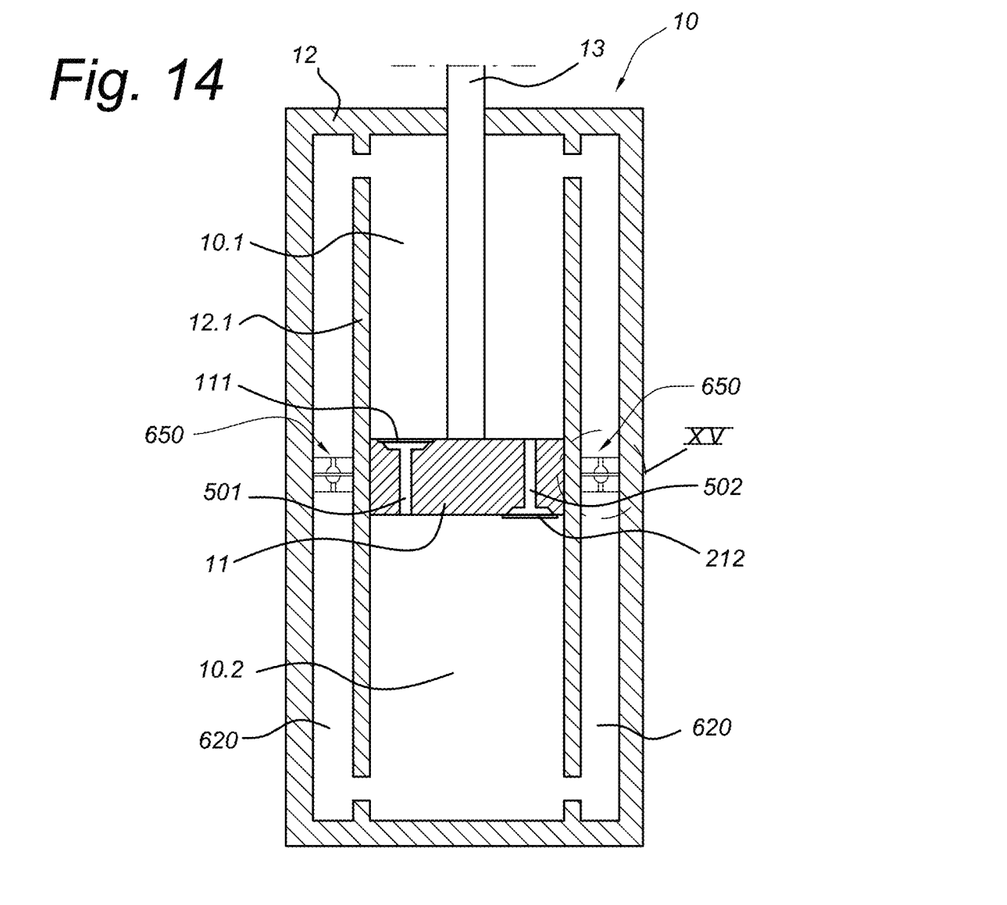
FIG. 14 shows yet another embodiment of a shock absorber according to the invention.
Figure 15:
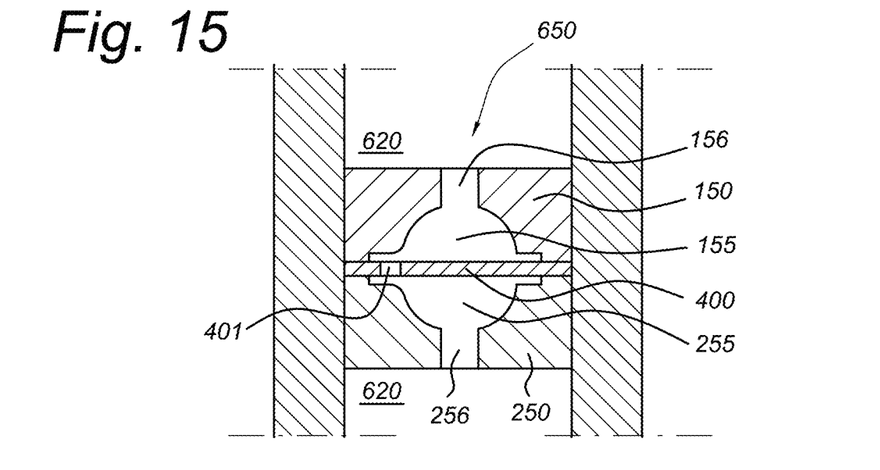
FIG. 15 shows a detail of a comfort valve of the shock absorber of FIG. 14.

The embodiment shown in FIGS. 14 and 15 comprises an annular channel 620 around the cylinder chambers 10.1, 10.2. A comfort valve arrangement 650 is provided in the channel 620 and is shown in more detail in FIG. 15. In a similar fashion as has been described with reference to FIGS. 12 and 13, the comfort valve arrangement comprises first and second members 150, 250 clamping a comfort valve 400 there between. The comfort valve is shaped as an annular plate valve and comprises openings 401. The first and second members 150, 250 also comprise annular grooves 255, 256 and auxiliary channels 156, 256, and are provided around the cylinder 12. The functioning and damping behavior of the comfort channel 620, 156, 155, 255, 256 and comfort valve 400 is similar as has been described with respect to the earlier embodiments.

The invention claimed is:

1. A shock absorber (10), comprising:
a cylinder having a cylinder wall;
a piston that seals against the cylinder wall and that divides the cylinder into first and second cylinder chambers, wherein the piston is movable within the cylinder along the cylinder wall and along a longitudinal direction of the piston and the cylinder in inward and outward directions upon inward and outward movement, respectively, of the piston inside the cylinder, and wherein a first side of the piston is associated with the first cylinder chamber and a second side of the piston is associated with the second cylinder chamber;
a first main channel in the piston, and a first main non-return valve in the piston and associated with the first main channel, such that the first main channel and the first main non-return valve allow and damp a first main fluid flow from the second side to the first side of the piston;

a second main channel in the piston, and a second main non-return valve in the piston and associated with the second main channel, such that the second main channel and the second main non-return valve allow and damp a second main fluid flow from the first cylinder chamber to the second cylinder chamber;

a comfort channel arranged in the piston to allow an auxiliary fluid flow between the first and second sides of the piston; and a comfort valve configured and arranged in the piston in the comfort channel such that the comfort valve provides for an open connection for the auxiliary fluid flow through the comfort channel in a rest position of the comfort valve and gradually closes off the auxiliary fluid flow at increasing pressure difference across the comfort valve at either inward or outward movement to influence the auxiliary fluid flow between the first and second sides of the piston, wherein the comfort valve is deformable and includes at least one flow opening for the auxiliary fluid flow, and wherein the comfort valve deforms in response to the increasing pressure difference such that the at least one flow opening deforms against at least one closing surface of the piston to close off the at least one flow opening against the at least one closing surface.

2. The shock absorber according to claim 1, wherein the comfort valve is configured and arranged to allow deformation of the comfort valve at a pressure difference across the comfort valve, and wherein an open area of the at least one flow opening allows the auxiliary fluid flow past the comfort valve to be gradually decreased upon increased deformation of the comfort valve.

3. The shock absorber according to claim 2, wherein the comfort valve comprises at least one annular plate, wherein the comfort valve is formed by a stack of the at least one annular plate, and wherein the stack of the at least one annular plate has a free end.

4. The shock absorber according to claim 3, wherein the at least one flow opening comprises at least one flow opening in the stack of the at least one annular plate, and wherein the at least one closing surface of the piston comprises closing surfaces against which the stack of the at least one annular plate gradually deforms upon inward and outward movement to gradually close off the at least one flow opening in the stack of the at least one annular plate.

5. The shock absorber according to claim 4, wherein the closing surfaces present a curvature, and wherein the stack of the at least one annular plate upon deformation conforms to the curvature so that the open area of the at least one flow opening in the stack of at least one annular plate is gradually closed by the closing surfaces.

6. The shock absorber according to claim 4, wherein the first and second clamping parts define the at least one closing surface.

7. The shock absorber according to claim 3, wherein the at least one annular plate comprises a free outer circumference and a clamped inner circumference, and wherein the at least one flow opening is arranged between the free outer circumference and the clamped inner circumference.

8. The shock absorber according to claim 1, wherein the shock absorber comprises first and second clamping parts wherein the comfort valve is clamped in between the first and second clamping parts.

9. The shock absorber according to claim 1, wherein the comfort channel is arranged in direct fluid communication with the first and second main channels.

10. The shock absorber according to claim 1, wherein the piston comprises a ring-shaped connecting member;

a first central member received in the connecting member at a first side of the connecting member, which is transverse to the longitudinal direction of the piston and associated with the first side of the piston, wherein a first central member channel is provided on a side of the first central member, which is transverse to the longitudinal direction of the piston and associated with the second side of the piston, and wherein the first central member channel is in fluid communication with the second side of the piston; and a second central member received in the connecting member at a second side of the connecting member, which is transverse to the longitudinal direction of the piston and associated with the second side of the piston, wherein a second central member channel is provided on a side of the second central member, which is transverse to the longitudinal direction of the piston and associated with the first side of the piston, wherein the second central member channel is in fluid communication with the first side of the piston, and wherein the comfort channel comprises the first and second central member channels and the comfort valve is provided in between the first and second central member channels.

11. The shock absorber according to claim 10, wherein:

the connecting member comprises a part of the first main channel and a part of the second main channel, the first central member comprises another part of the first main channel such that the parts of the first main channel in the connecting member and the first central member are in line, and the second central member comprises another part of the second main channel such that the parts of the second main channel in the connecting member and the second central member are in line.

12. The shock absorber according to claim 11, wherein the connecting member is configured for movement along and seals against the cylinder wall.

13. The shock absorber according to claim 11, wherein the first main non-return valve is provided on the first central member.

14. The shock absorber according to claim 11, wherein the second main non-return valve is provided on the second central member.

15. The shock absorber according to claim 11, wherein the part of the first main channel in the connecting member has two ends, wherein one end is in line with the part of the first main channel in the first central member, and wherein another end is in direct fluid connection with the second side of the piston.

16. The shock absorber according to claim 11, wherein the part of the second main channel in the connecting member has two ends, wherein one end is in line with the part of the second main channel in the second central member, and wherein another end is in direct fluid connection with the first side of the piston.

17. The shock absorber according to claim 11, wherein the first central member channel is in direct fluid connection with the part of the first main channel in the first central member, wherein a first auxiliary channel is provided in the first central member, which extends from the first central member channel to a side of the first central member opposing the side comprising the first central member channel, to provide for a direct fluid connection between the first central member channel and the another part of the first main channel in the first central member.

18. The shock absorber according to claim 11, wherein the second central member channel in direct fluid connection with the part of the second main channel in the second central member, wherein a second auxiliary channel is provided in the second central member, which extends from the second central member channel to a side of the second central member opposing the side comprising the second central member channel, to provide for a direct fluid connection between the second central member channel and the part of the second main channel in the second central member.

19. The shock absorber according to claim 11, wherein the parts of the first and second main channels in the connecting member are provided alternately in the connecting member.

20. The shock absorber according to claim 10, wherein the first central member channel comprises a first central member groove provided at the side of the first central member, which is transverse to the longitudinal direction of the piston and associated with the second side of the piston.

21. The shock absorber according to claim 20, wherein the second central member channel comprises a second central member groove, which is transverse to the longitudinal direction of the piston and provided at the side of the second central member associated with the first side of the piston.

22. The shock absorber according to claim 21, wherein the first central member groove comprises an annular groove, the second central member groove comprises an annular groove, and the comfort valve comprises a stack of at least one annular plate valve.

23. The shock absorber according to claim 10, wherein the connecting member comprises one of a slot and projection at its internal perimeter, wherein at least one of the first and second central members comprises the other one of the projection and the slot at its external perimeter, wherein the slot and projection are configured to cooperate such as to align the connecting member and the at least one of the first and second central members with respect to one another.

24. The shock absorber according to claim 10, wherein the connecting member and at least one of the first and second central members are press-fitted into one another such as to provide a sealing fit.

25. The shock absorber according to claim 10, wherein the piston comprises more than one a plurality of first main channels, wherein the connecting member comprises a part of each first main channel in line with another part of each first main channel comprised in the first central member.

26. The shock absorber according to claim 10, wherein the piston comprises a plurality of second main channels, and wherein the connecting member comprises a part of each second main channel in line with another part of each second main channel comprised in the second central member.

27. A piston for use in a shock absorber, the piston comprising:
a first side of the piston and a second side of the piston, wherein the first side of the piston is associated with a first cylinder chamber of the shock absorber, and wherein the second side of the piston is associated with a second cylinder chamber of the shock absorber;
a first main channel in the piston, and a first main non-return valve in the piston and associated with the first main channel, such that the first main channel and the first main non-return valve allow and damp a first main fluid flow from the second side to the first side of the piston;
a second main channel in the piston, and a second main non-return valve in the piston and associated with the second main channel, such that the second main channel and the second main non-return valve allow and damp a second main fluid flow from the first cylinder chamber to the second cylinder chamber;
a comfort channel arranged in the piston to allow an auxiliary fluid flow between the first and second sides of the piston;
a comfort valve configured and arranged in the piston in the comfort channel such that the comfort valve provides for an open connection for the auxiliary fluid flow through the comfort channel in a rest position of the comfort valve and gradually closes off the auxiliary fluid flow at increasing pressure difference across the comfort valve at either inward or outward movement to influence the auxiliary fluid flow between the first and second sides of the piston,
wherein the comfort valve comprises a deformable annular plate having at least one flow opening through the annular plate for the auxiliary fluid flow, and wherein the annular plate deforms in response to the increasing pressure difference such that the at least one flow opening deforms against at least one closing surface of the piston to close off the at least one flow opening against the at least one closing surface
a ring-shaped connecting member;
a first central member that includes the at least one closing surface and that is received in the connecting member at a first side of the connecting member, which is transverse to a longitudinal direction of the piston and associated with the first side of the piston, wherein a first central member channel is provided on a side of the first central member, which is transverse to the longitudinal direction of the piston and associated with the second side of the piston (11), and wherein the first central member channel is in fluid communication with the second side of the piston; and
a second central member that includes the at least one closing surface and that is received in the connecting member at a second side of the connecting member, which is transverse to the longitudinal direction of the piston and associated with the second side of the piston, wherein a second central member channel being is provided on a side of the second central member, which is transverse to the longitudinal direction of the piston and associated with the first side of the piston, wherein the second central member channel is in fluid communication with the first side of the piston, and
wherein the comfort channel comprises the first and second central member channels and the comfort valve is provided in between the first and second central member channels.

28. The piston according to claim 27, wherein:
the connecting member comprises a part of the first main channel and a part of the second main channel, and wherein the first central member comprises another part of the first main channel such that the parts of the first main channel in the connecting member and the first central member are in line, and
the second central member comprises another part of the second main channel such that the parts of the second main channel in the connecting member and the second central member are in line.

\* \* \* \* \*